(12) United States Patent
Hamlin

(10) Patent No.: US 10,829,047 B2
(45) Date of Patent: Nov. 10, 2020

(54) REARVIEW ASSEMBLY

(71) Applicant: Gentex Corporation, Zeeland, MI (US)

(72) Inventor: Bradley R. Hamlin, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/914,576

(22) Filed: Mar. 7, 2018

(65) Prior Publication Data

US 2018/0257566 A1    Sep. 13, 2018

Related U.S. Application Data

(60) Provisional application No. 62/469,680, filed on Mar. 10, 2017.

(51) Int. Cl.
| | | |
|---|---|---|
| *B60R 1/04* | (2006.01) | |
| *B60R 1/12* | (2006.01) | |
| *B60R 16/03* | (2006.01) | |
| *B60R 1/00* | (2006.01) | |

(52) U.S. Cl.
CPC .............. *B60R 1/04* (2013.01); *B60R 1/00* (2013.01); *B60R 1/12* (2013.01); *B60R 16/03* (2013.01); *B60R 2001/1223* (2013.01)

(58) Field of Classification Search
CPC ...... B60R 1/04; B60R 1/12; B60R 2001/1223
USPC ....................................................... 248/481
See application file for complete search history.

(56) References Cited

U.S. PATENT DOCUMENTS

| | | | |
|---|---|---|---|
| 4,225,212 A | | 9/1980 | Grabowski |
| 4,646,210 A | * | 2/1987 | Skogler ................. B60R 1/1207 359/872 |
| 5,190,499 A | | 3/1993 | Mori et al. |
| 5,572,354 A | * | 11/1996 | Desmond .................. B60R 1/04 359/265 |
| 5,798,688 A | * | 8/1998 | Schofield ................ B60R 1/086 340/438 |
| 5,971,553 A | | 10/1999 | Durnwald |
| 6,068,380 A | | 5/2000 | Lynn et al. |
| 6,243,003 B1 | | 6/2001 | DeLine et al. |
| 6,300,879 B1 | | 10/2001 | Regan et al. |
| 6,315,421 B1 | | 11/2001 | Apfelbeck et al. |
| 6,326,613 B1 | | 12/2001 | Heslin et al. |
| 6,467,919 B1 | | 10/2002 | Rumsey et al. |
| 6,483,438 B2 | | 11/2002 | DeLine et al. |
| 6,499,850 B2 | | 12/2002 | Waldmann |
| 6,501,387 B2 | | 12/2002 | Skiver et al. |
| 7,370,985 B2 | | 5/2008 | Boddy et al. |

(Continued)

*Primary Examiner* — Bradley Duckworth
(74) *Attorney, Agent, or Firm* — Price Heneveld LLP; Bradley D. Johnson

(57) ABSTRACT

A rearview assembly includes a two ball mount. A first end is operably coupled with an inside surface of a windscreen. A wire harness is routed through the two ball mount. A second end includes a mounting plate with an electrical connector disposed thereon. A housing is operably coupled with the mounting plate at a rear wall of the housing. A circuit board is disposed within the housing and includes a circuit board connector configured for engagement with the electrical connector at the rear wall of the housing, wherein the housing is free of wiring extending through the housing. An electro-optic element is disposed within the housing and conceals the circuit board.

19 Claims, 17 Drawing Sheets

(56) References Cited

U.S. PATENT DOCUMENTS

| | | |
|---|---|---|
| 7,746,535 B2 | 6/2010 | Kelley et al. |
| 8,201,800 B2 | 6/2012 | Filipiak |
| 2005/0128610 A1 | 6/2005 | Parker et al. |
| 2007/0001356 A1 | 1/2007 | Adoline et al. |
| 2008/0310006 A1* | 12/2008 | Kelley ..................... B60R 1/02 359/267 |
| 2010/0033857 A1* | 2/2010 | Filipiak ................... B60R 1/04 359/872 |
| 2016/0082889 A1 | 3/2016 | Minikey, Jr. |
| 2016/0159287 A1* | 6/2016 | Minikey, Jr. ............. B60R 1/04 250/214 AL |

* cited by examiner

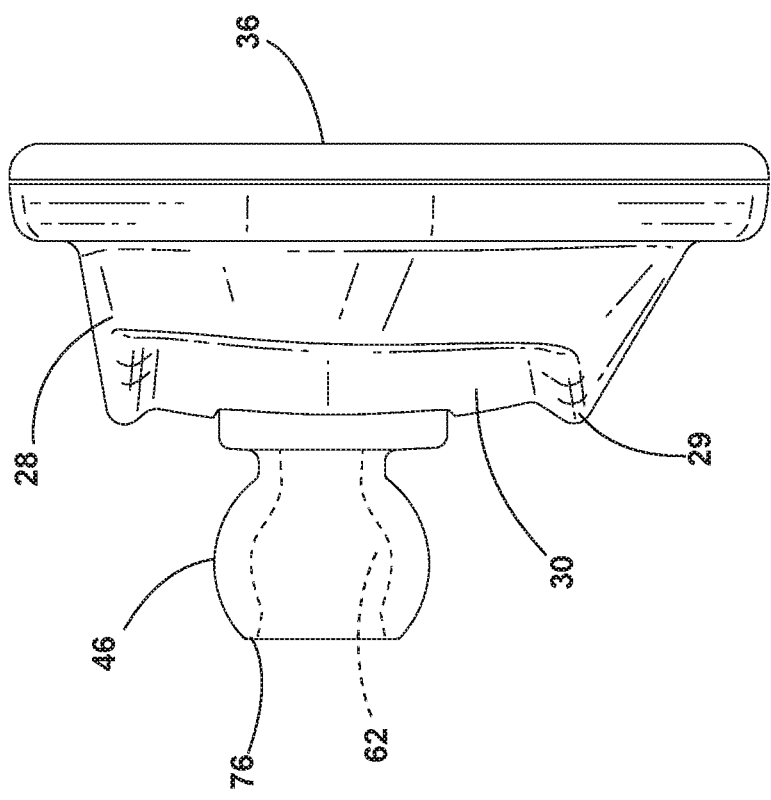

REARVIEW ASSEMBLY

CROSS-REFERENCE TO RELATED APPLICATION

This application claims priority to and the benefit under 35 U.S.C. § 119(e) of U.S. Provisional Patent Application No. 62/469,680, filed on Mar. 10, 2017, entitled "REARVIEW ASSEMBLY," the entire disclosure of which is hereby incorporated herein by reference.

FIELD OF THE DISCLOSURE

The present disclosure generally relates to a rearview assembly for a vehicle, and more particularly to a rearview assembly for a vehicle.

SUMMARY OF THE DISCLOSURE

According to one aspect of the present disclosure, a rearview assembly includes a two ball mount. A first end is operably coupled with an inside surface of a windscreen. A wire harness is routed through the two ball mount. A second end includes a mounting plate with an electrical connector disposed thereon. A housing is operably coupled with the mounting plate at a rear wall of the housing. A circuit board is disposed within the housing and includes a circuit board connector configured for engagement with the electrical connector at the rear wall of the housing, wherein the housing is free of wiring extending through the housing. An electro-optic element is disposed within the housing and conceals the circuit board.

According to another aspect of the present disclosure, a rearview assembly includes a mount. A first end is operably coupled with an inside surface of a windscreen. A wire harness is routed through the mount. A second end includes a mounting plate with an electrical connector disposed thereon. A housing is operably coupled with the mounting plate. A circuit board is disposed within the housing and includes a circuit board connector configured for engagement with the electrical connector at the mounting plate. An electro-optic element is disposed within the housing and conceals the circuit board.

According to yet another aspect of the present disclosure, a rearview device for a vehicle includes a mount configured to be operably coupled with a vehicle windshield. The mount includes a channel therethrough. A wiring harness routed through the channel. A housing including a circuit board connector is configured to receive an electrical connector of the wiring harness at a rear wall of the housing. An ambient light sensor optic is operably coupled an interior wall of the housing.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 5 is a side elevational view of the rearview assembly of FIG. 2A;

DETAILED DESCRIPTION

Figure 1A:
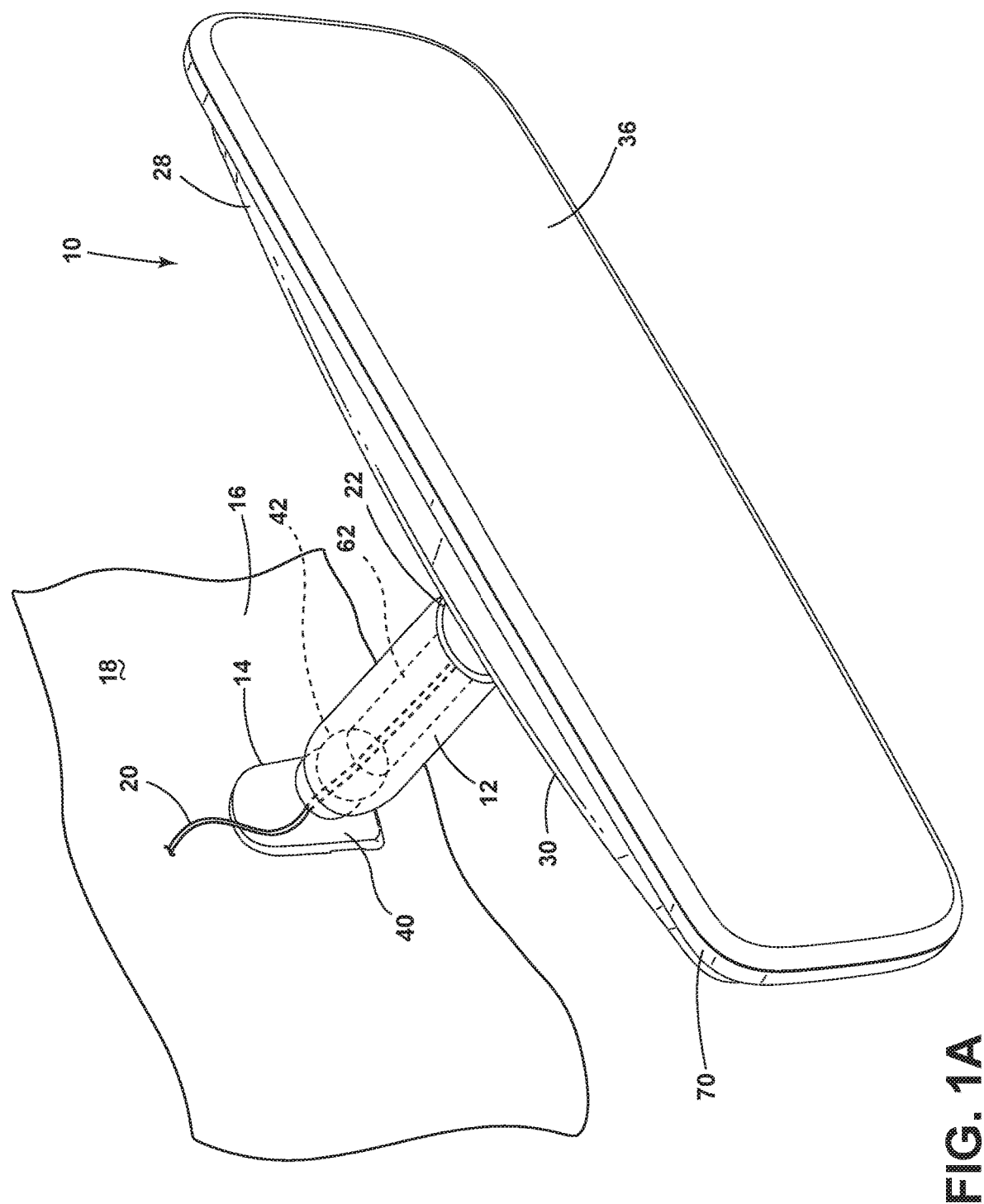
FIG. 1A is a front perspective view of a rearview assembly of the present disclosure.

The present illustrated embodiments reside primarily in combinations of method steps and apparatus components related to a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1A. Unless stated otherwise, the term "front" shall refer to the surface of the device closer to an intended viewer of the device, and the term "rear" shall refer to the surface of the element further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1A-15, reference numeral 10 generally designates a rearview assembly that includes a two ball mount 12. A first end 14 of the two ball mount 12 is configured to be operably coupled with an inside surface 16 of a windscreen 18. A wire harness 20 is routed through the two ball mount 12. A second end 22 of the two ball mount 12 includes a mounting plate 24 with an electrical connector 26 disposed thereon. A housing 28 is operably coupled with the mounting plate 24 at a rear wall 30 of the housing 28. A circuit board 32 is disposed within the housing 28 and includes a circuit board connector 34 configured for engagement with the electrical connector 26 at the rear wall 30 of the housing 28. An electro-optic element 36 is disposed within the housing 28 and conceals the circuit board 32.

With reference again to FIG. 1A, the illustrated rearview assembly 10 is configured for use inside a vehicle. It will be understood that the vehicle may be any of a variety of vehicles, including trucks, cars, vans, etc. It will also be understood that the principles set forth herein may also be applied to other rearview assemblies that can be used elsewhere inside or outside the vehicle. As illustrated in FIG. 1A, the housing 28 supports the electro-optic element 36 at a periphery of electro-optic element 36. The electro-optic element 36 may include a bezel or may be bezelless. In addition, the electro-optic element 36 may include a rounded peripheral edge, sometimes referred to as a ground edge.

Figure 1B:
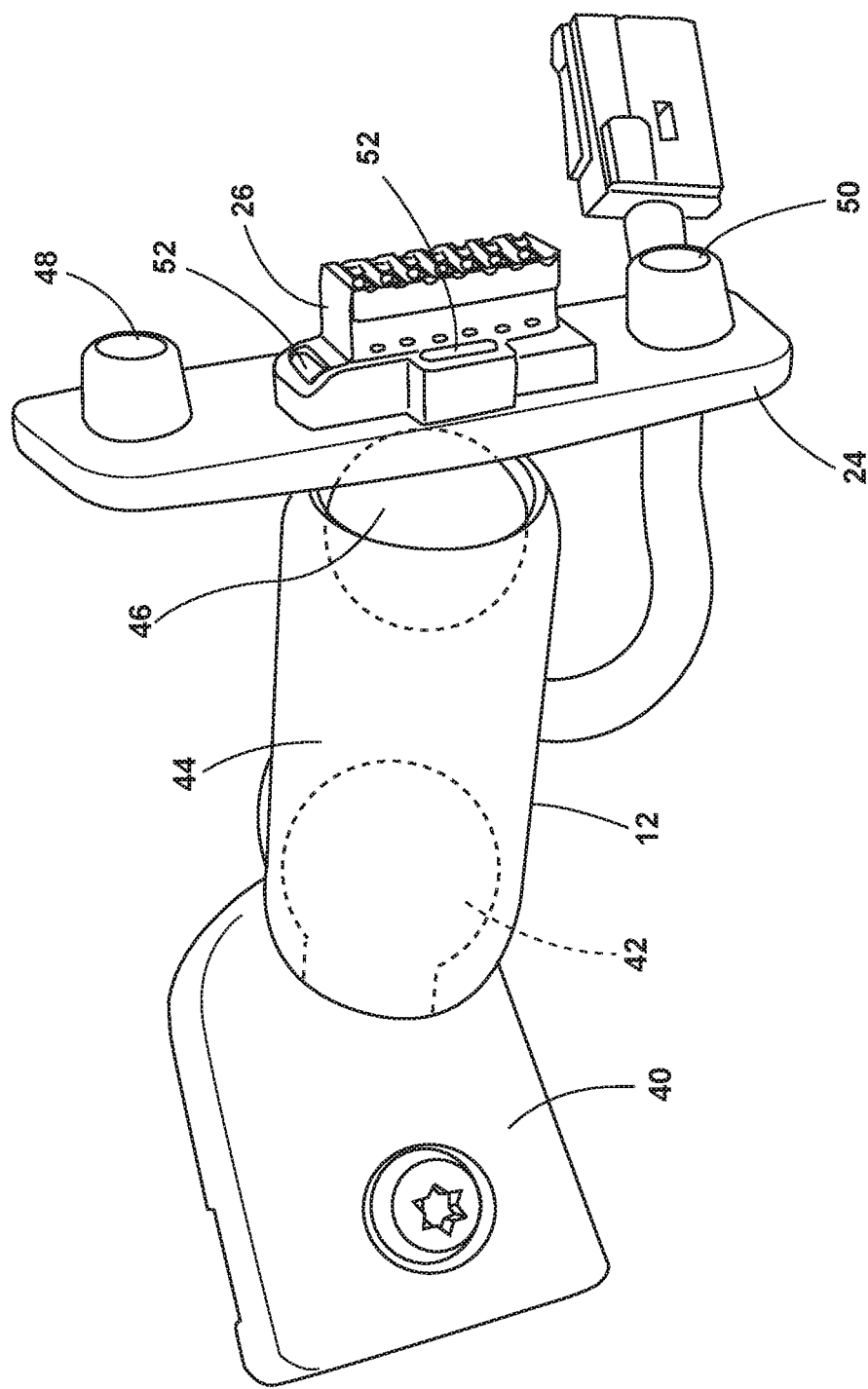
FIG. 1B is a bottom perspective view of a mount for a rearview assembly of the present disclosure.
Figure 3:
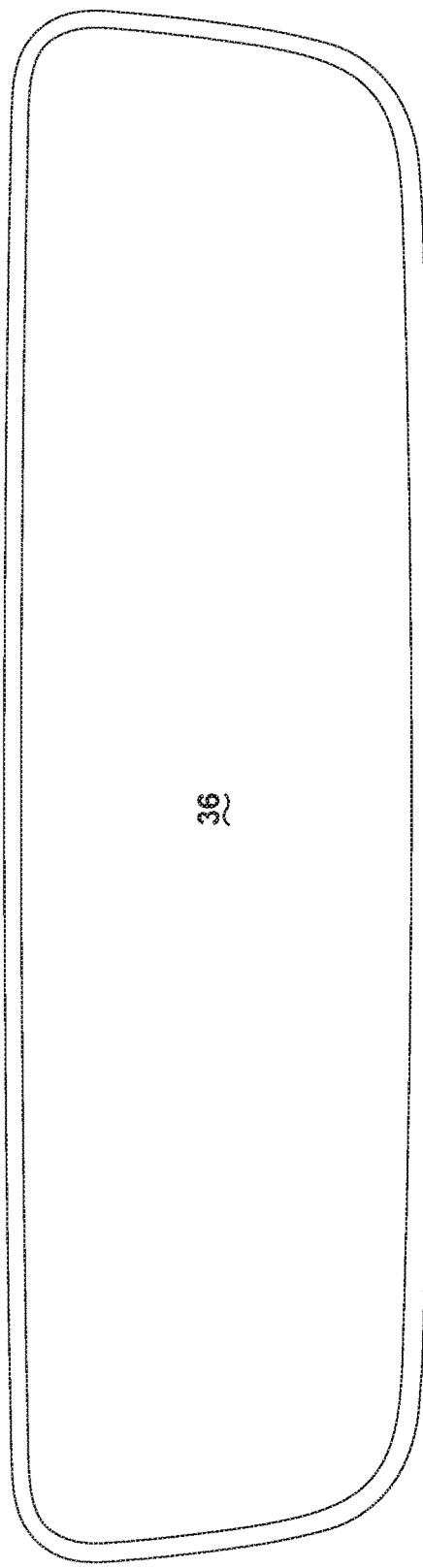
FIG. 3 is a front elevational view of the rearview assembly of FIG. 2A.
Figure 6A:
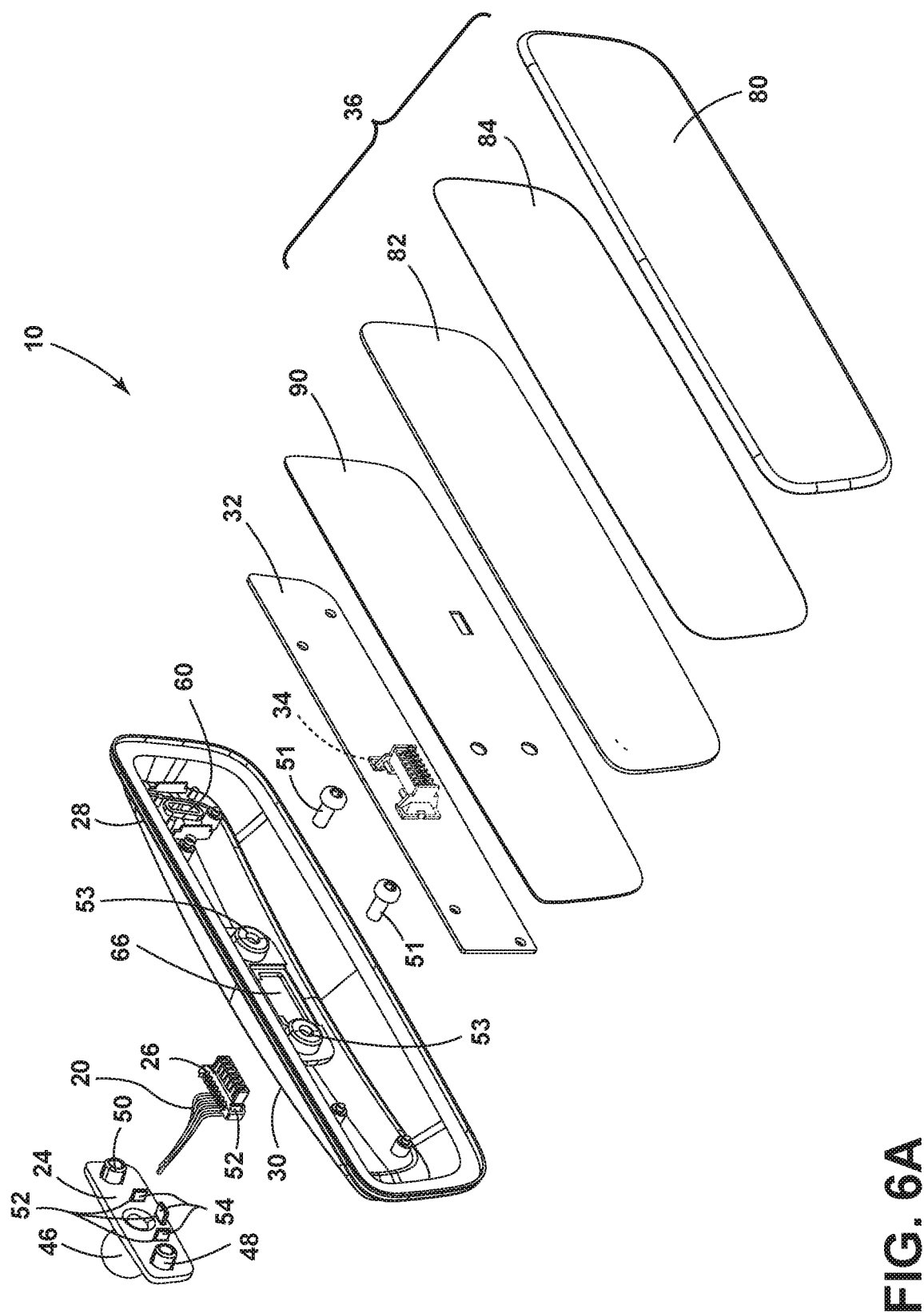
FIG. 6A is an exploded front perspective view of the rearview assembly of FIG. 2A.

As illustrated in FIG. 1B, the two ball mount 12 is configured to provide increased movement of the rearview assembly 10 relative to the windscreen 18. The first end 14 of the two ball mount 12 includes a mount bracket 40 with a first ball (mount bracket ball) 42 extending therefrom. A barrel 44 of the two ball mount 12 is configured to receive the first ball 42, as well as a second ball (mounting plate ball) 46 that is operably coupled with the mounting plate 24 and the electrical connector 26. First and second fastener apertures 48, 50 protrude through the mounting plate 24 and are configured to receive fasteners 51 that extend through receiving apertures 53 of the rear wall 30 to secure the mounting plate 24 with the rear wall 30 of the housing 28. In addition, the electrical connector 26 includes a plurality of locating features in the form of apertures 52 configured to receive complementary locating features in the form of protrusions 54 (FIG. 6A) on the mounting plate 24. As illustrated in FIGS. 3 and 6A, the electrical connector 26 may include three apertures 52 that are configured to align with and engage three protrusions 54 extending from the mounting plate 24. It will be understood that other locating features and securing features could also be used. For example, the electrical connector 26 may be coupled with the mounting plate by welding, snap-fit engagement, mechanical fasteners, adhesive, etc.

Figure 2A:
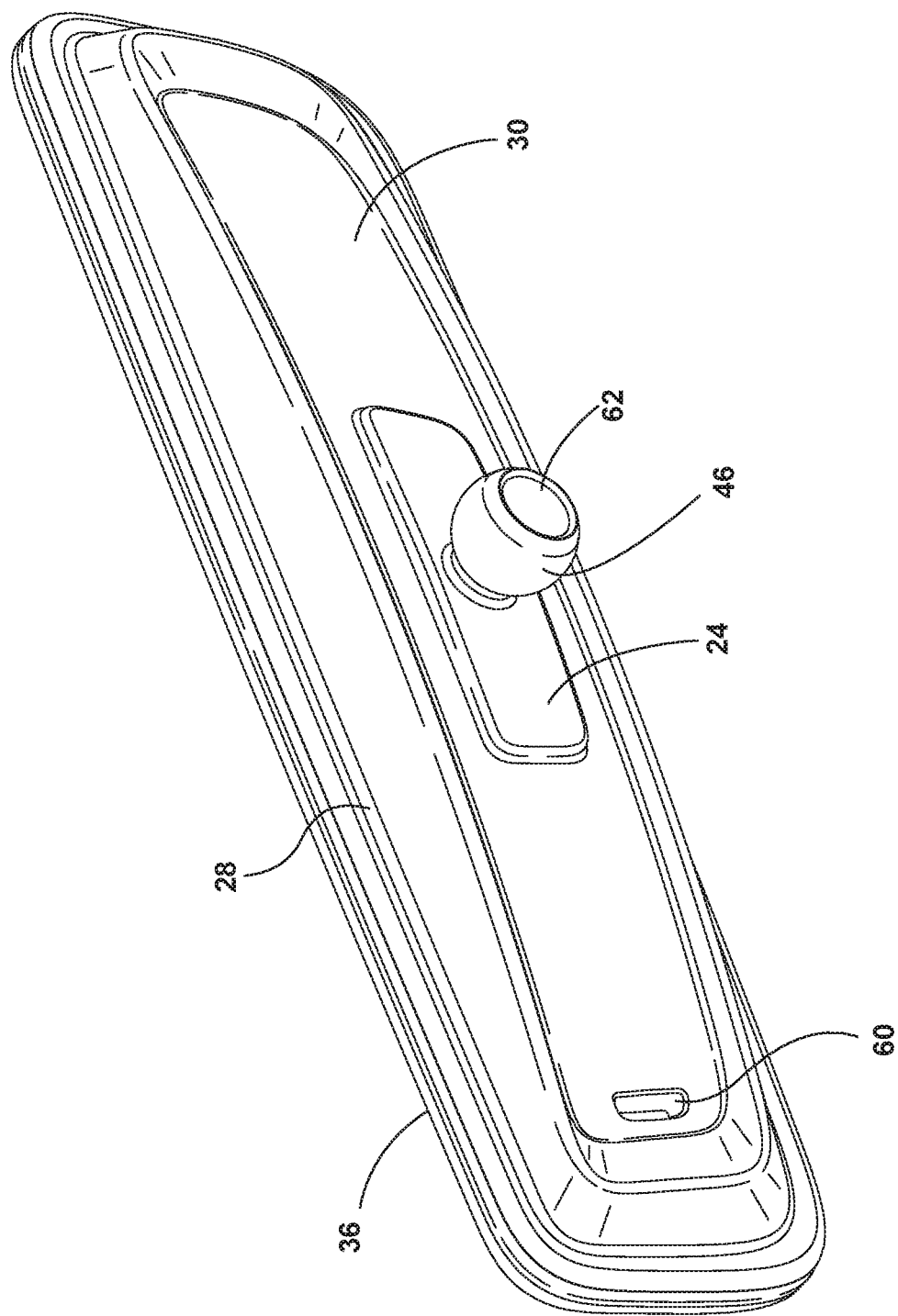
FIG. 2A is a rear top perspective view of a rearview assembly of the present disclosure.
Figure 2B:
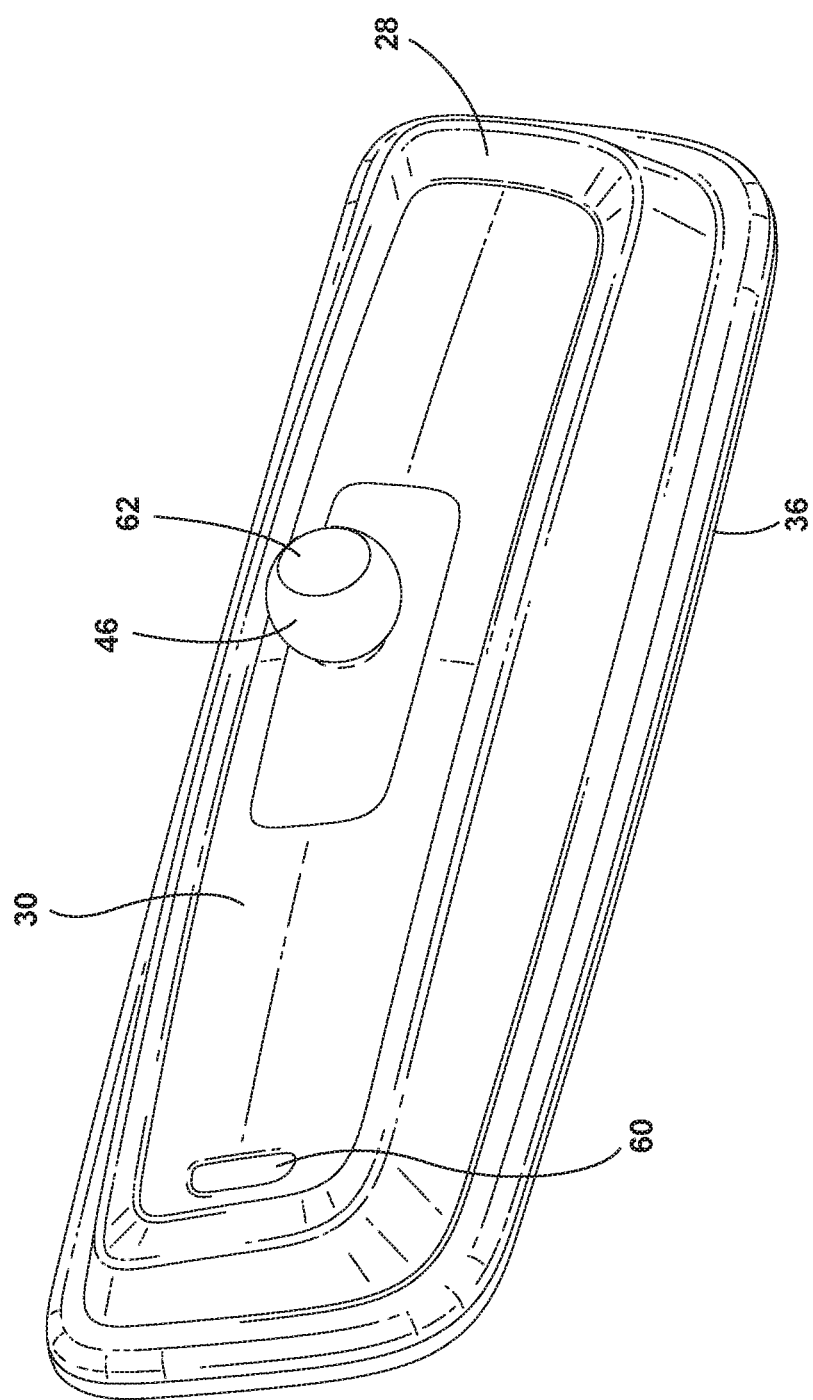
FIG. 2B is a rear bottom perspective view of the rearview assembly of FIG. 2A.

As shown in FIGS. 2A and 2B, the rear wall 30 of the housing 28 includes an aperture 60 that is in optic communication with an internal ambient light sensor 61. The ambient light sensor 61 is configured to detect levels of light around the rearview assembly 10 and the mounting assembly that attaches the rearview assembly 10 to a vehicle interior. In addition, the mounting plate ball 46 of the two ball mount 12 is illustrated. The mounting plate ball 46 extends laterally from the rear wall 30 of the housing 28, but could also extend upwardly or downwardly, depending on the intended use of the rearview assembly 10. The significance of the mounting plate 24 is set forth in further detail herein. The mounting plate ball 46 includes a channel 62 extending therethrough that is in communication with a rear opening 66 (FIG. 6A) that provides access to an interior of the housing 28. The wire harness 20 is routed through the channel 62 to provide an electrical and/or data connection of the rearview assembly 10 with the vehicle.

With reference again to FIGS. 2A and 2B, the housing 28 includes a forward peripheral edge configured to interface with a bezel or the electro-optic assembly. It will be understood that the concepts set forth herein are configured for use with both constructions. The housing 28 also includes a rearwardly extending rim 29 that provides a gripping surface to a user when adjusting the rearview assembly after installation. However, it will be understood that the rear wall 30 of the housing 28 may take on alternative constructions and is not limited to the housing 28 as shown.

Figure 4:
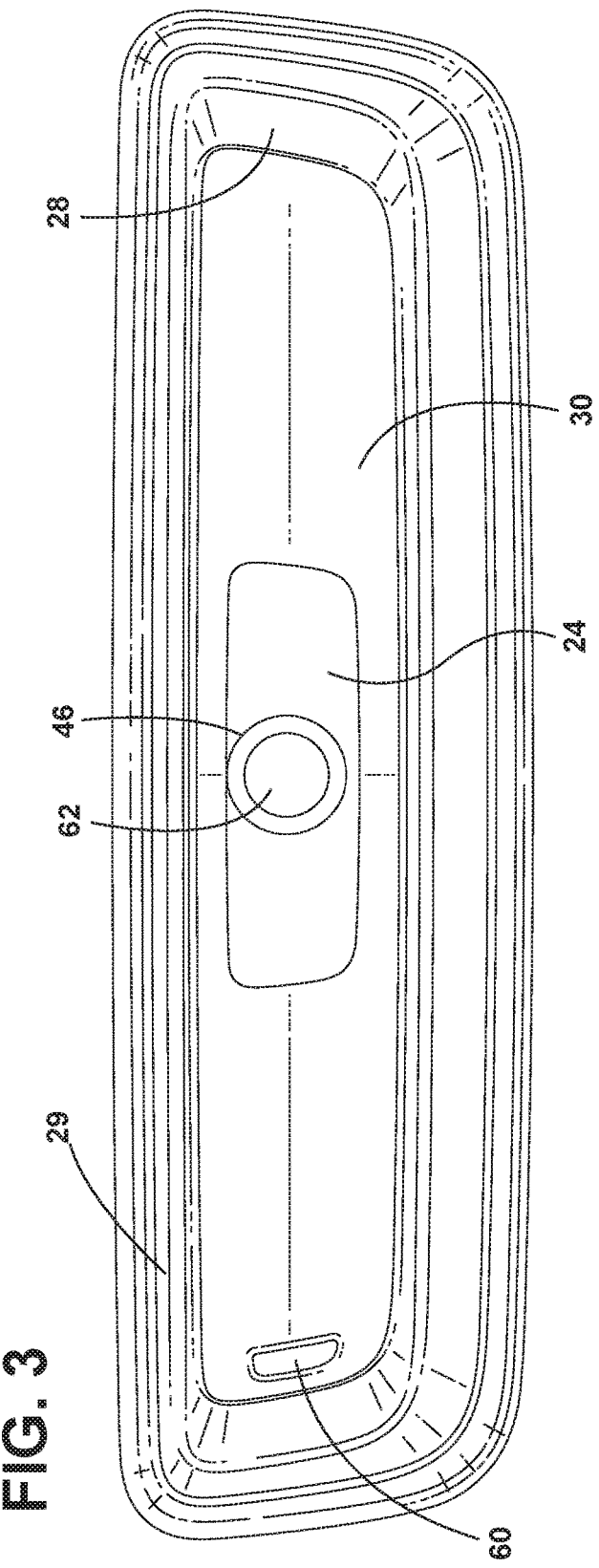
FIG. 4 is a rear elevational view of the rearview assembly of FIG. 2A.

With reference now to FIGS. 3 and 4, the illustrated electro-optic element 36 includes a defined periphery that is generally equivalent to a periphery of a forward edge 70 of the housing 28. However, as previously noted, it will be understood that the periphery of the housing 28 and the periphery of the electro-optic element 36 may be different. In addition, as shown in FIG. 3, the mounting plate 24 extends across a midportion of the rear wall 30 of the housing 28. However, it will be understood that the plate may be larger or smaller than that illustrated in FIG. 3. For example, the mounting plate 24 could extend across the entire back side of the rear wall 30 of the housing 28. Alternatively, the mounting plate 24 may cover only a small portion of the rear wall 30 of the housing 28. The size, shape, and positioning of the mounting plate 24 will vary depending on the needs of the rearview assembly 10.

With reference now to FIG. 5, it is noted that the housing 28 includes an intermediate section configured to house various mechanical and electrical components for use with the rearview assembly 10. These components may include display modules, sensors, circuit boards, and wire harnesses, among other possible components. In addition, the channel 62 that extends through the mounting plate ball 46 is shown in phantom. Further, it is noted that the mounting plate ball 46 is not a completely spherical ball and includes a generally planar distal end 76 where the channel 62 extends out of the mounting plate ball 46 that is received by the barrel 44 of the two ball mount 12.

Figure 6B:
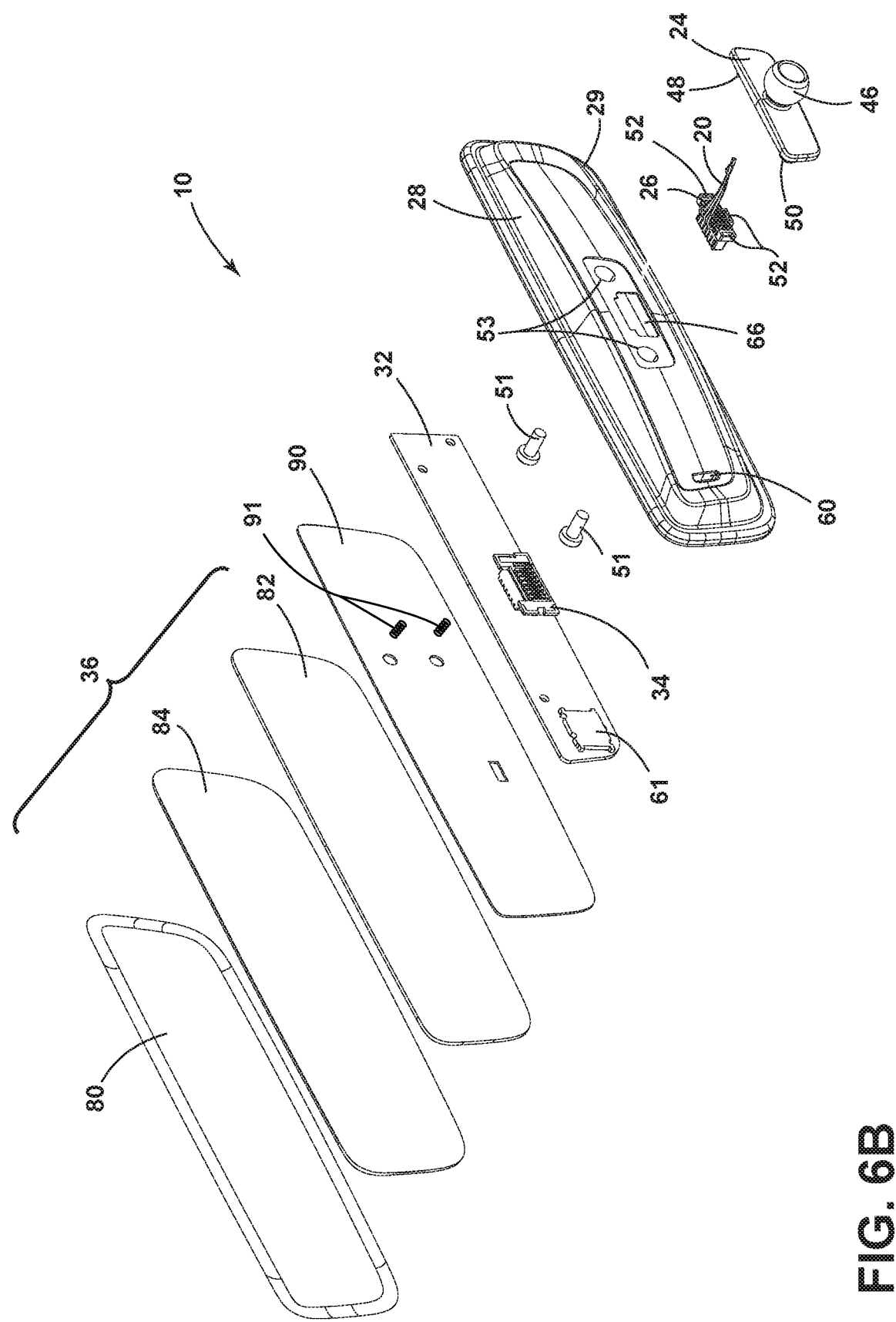
FIG. 6B is an exploded rear perspective view of the rearview assembly of FIG. 2A.

With reference now to FIGS. 6A and 6B, the various components of one example of a rearview assembly 10 is illustrated. As shown, the electro-optic element 36 includes a front substrate 80 and a rear substrate 82. An electro-optic medium 84 is disposed between the front substrate 80 and the rear substrate 82 and may be maintained between the front substrate 80 and the rear substrate 82 by a peripheral seal. A carrier plate 90 is disposed behind the rear substrate 82 and supports the electro-optic element 36 inside the housing 28. The circuit board 32 is disposed behind the carrier plate 90 and includes the circuit board connector 34 (FIG. 6B). The circuit board connector 34 is configured to receive the electrical connector 26 that extends through the mounting plate 24 of the two ball mount 12. Connection springs 91 electrically couple the circuit board 32 with the electro-optic element 36. The circuit board connector 34 is aligned with the rear opening 66 and a rear portion of the housing 28, such that upon alignment of the electrical connector 26 with the circuit board connector 34, and upon slight application of force of the mounting plate 24 with the rear wall 30 of the housing 28, a secure electrical communication can be maintained from the electrical connector 26 to the circuit board connector 34. Stated differently, during the connection of the mounting plate 24 with the rear wall 30 of the housing 28, the electrical connector 26 electrically couples with the circuit board connector 34. Consequently, no additional hookups or connections are necessary. Further, the housing 28 is devoid of any wiring that extends through the two ball mount 12 into the housing 28. Rather, the electrical connector 26 interfaces with the circuit board connector 34 at the rear opening 66 in the rear wall 30 of the housing 28. Because no additional wire hookups are necessary, the rearview assembly 10 can be manufactured with little or no human intervention.

Figure 7:
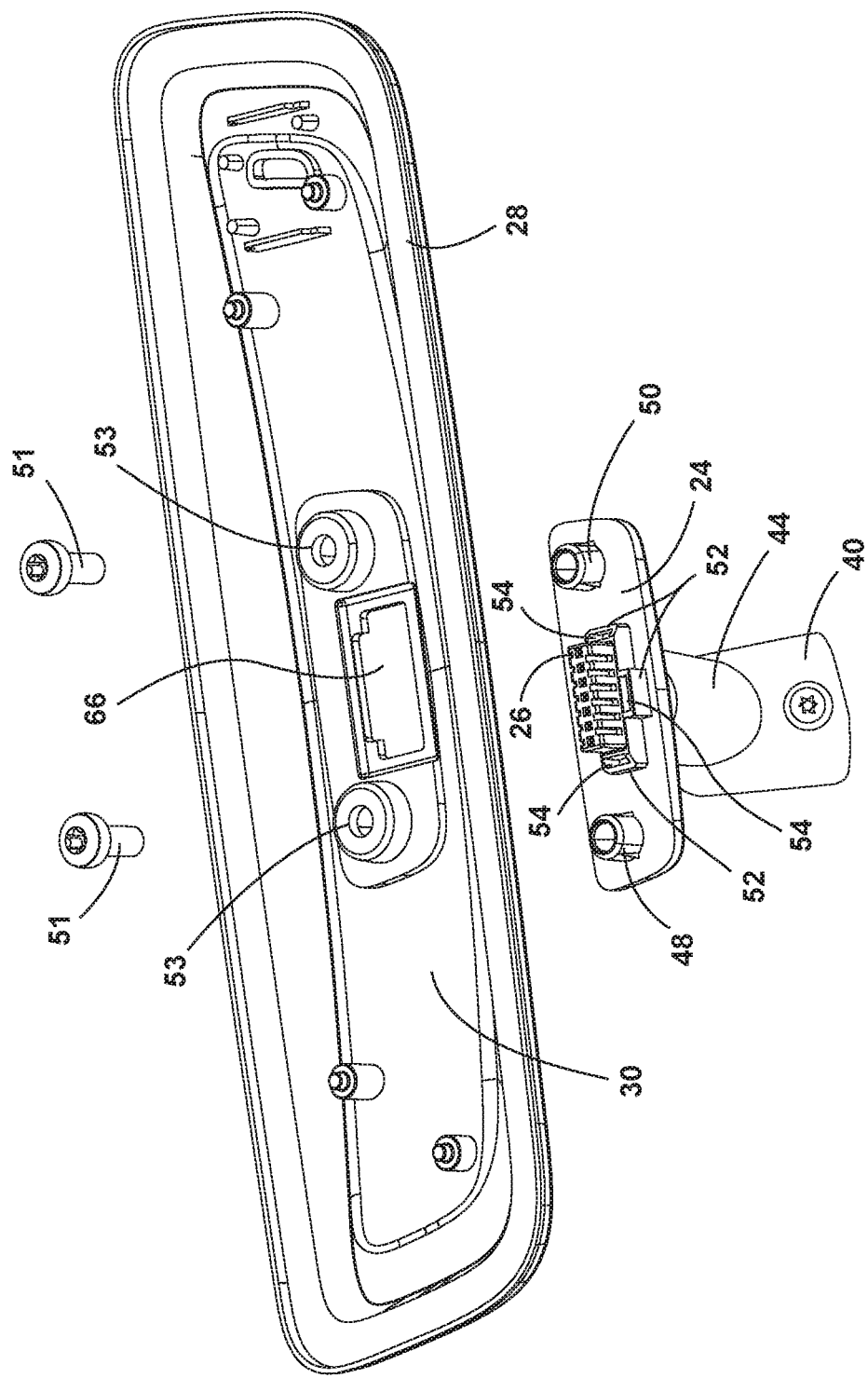
FIG. 7 is a bottom perspective view of a housing and mount for use with a rearview assembly of the present disclosure.
Figure 8:
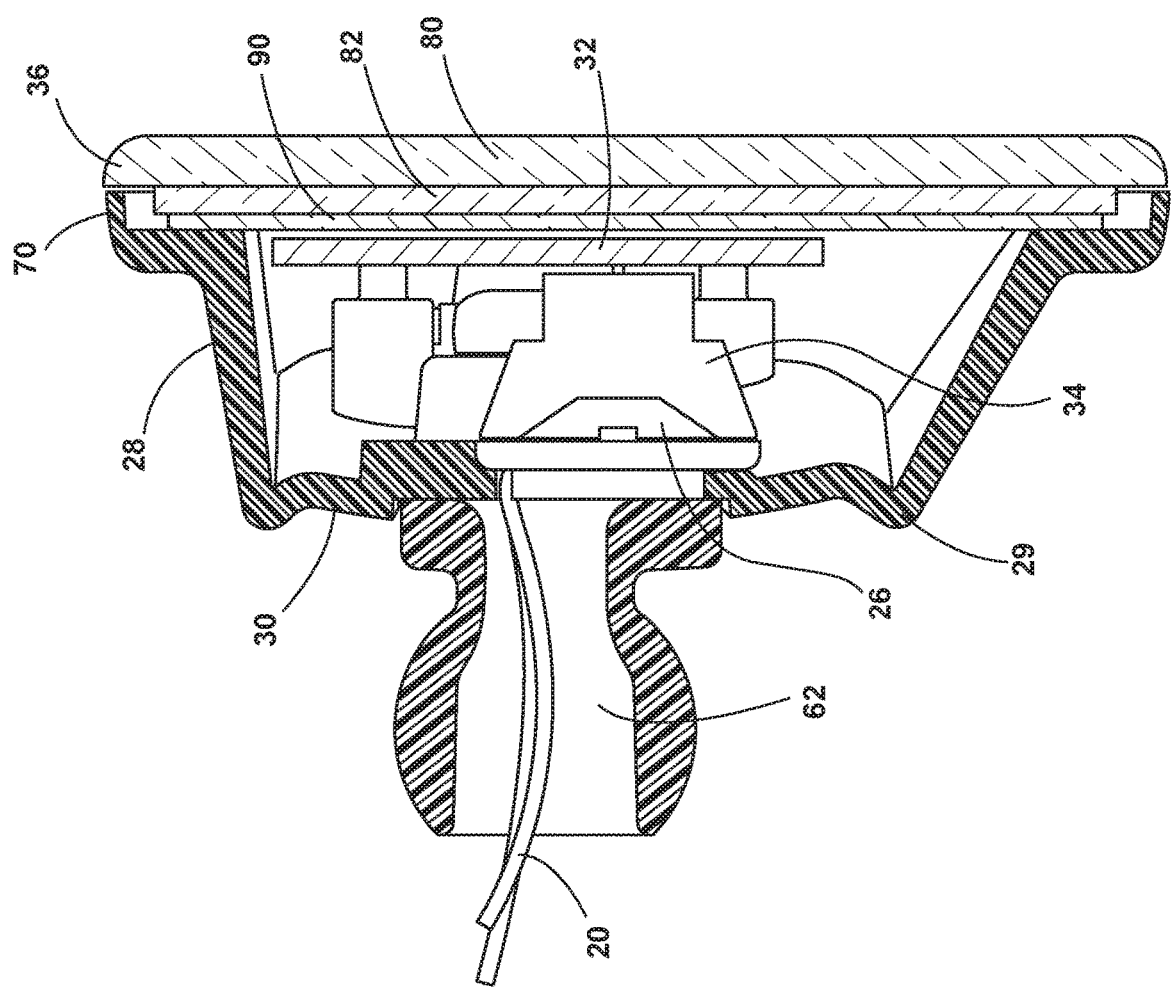
FIG. 8 is a side elevational cross-sectional view of a rearview assembly of the present disclosure.

In one example, as illustrated in FIG. 7, to maintain the connection, the first and second mechanical fasteners 51 are extended through the rear wall 30 of the housing 28 and into secure engagement with the fastener apertures 48, 50 that extend from the mounting plate 24 of the two ball mount 12. Notably, the rear opening 66 that extends to the rear wall 30 of the housing 28 is configured to accommodate the circuit board connector 34. In some instances, the opening 66 may include a periphery that is generally complementary to a perimeter shape of the electrical connector 26. Consequently, engagement of the mounting plate 24 with the rear wall 30 of the housing 28 results in simultaneous engagement of the electrical connector 26 with the circuit board connector 34 (FIG. 6A). This connection is maintained at the rear wall 30 of the housing 28 such that wiring extends through the channel 62, but does not enter the housing 28.

In one instance, a manufacturing process for constructing the rearview assembly 10 is as follows. The wire harness 20 is routed through the mounting plate ball 46 and electrically coupled with the electrical connector 26. The apertures 52 of the electrical connector 26 are then aligned with and secured with the protrusions 54 of the mounting plate 24. The electro-optic element 36 is assembled and operably coupled with the carrier plate 90. In addition, the circuit board 32 is operably coupled with the carrier plate 90. The circuit board connector 34, which is operably coupled with the circuit board 32, is aligned with the rear opening 66. The mounting plate 24 is then placed in abutting contact with the rear wall 30 of the housing 28 and secured thereto by fasteners 51. When the electro-optic element 36, the carrier plate 90, and the circuit board 32 are moved into contact so that the electro-optic element 36 is in abutting contact with the periphery of the housing 28, the circuit board connector 34 couples with the electrical connector 26, energizing the same. The rearview assembly 10 is constructed and can be tested for commercialization.

Figure 9:
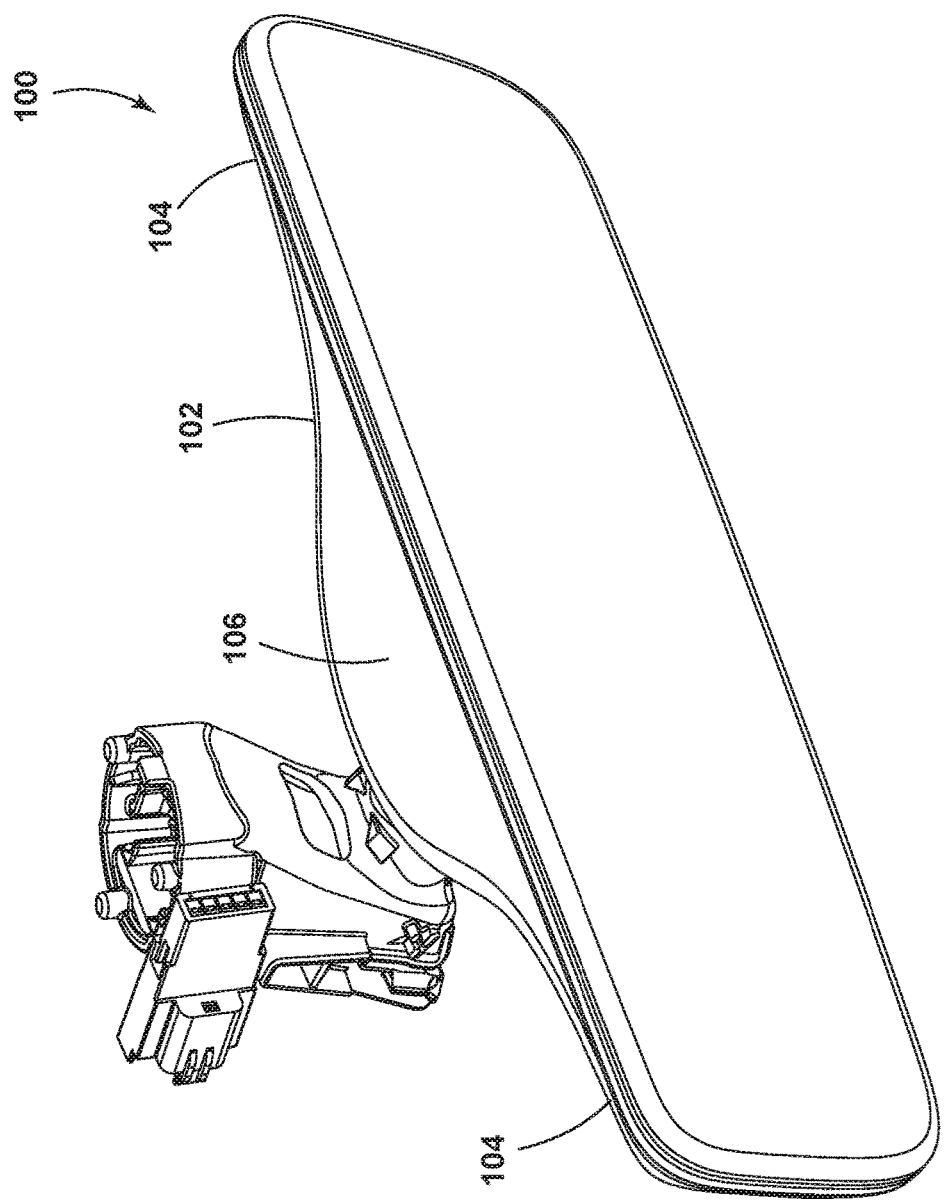
FIG. 9 is a front top perspective view of a rearview assembly of the present disclosure.

With reference now to FIG. 9, a single ball mount version of a rearview assembly 100 is illustrated. In the illustrated embodiment, many of the features between the single ball mount rearview assembly and the two ball mount rearview assembly of FIGS. 9-15 are similar or the same and will include like reference numerals. However, the interface of and the assembly method are different for the single ball mount construction as compared to the double ball mount construction.

Figure 10:
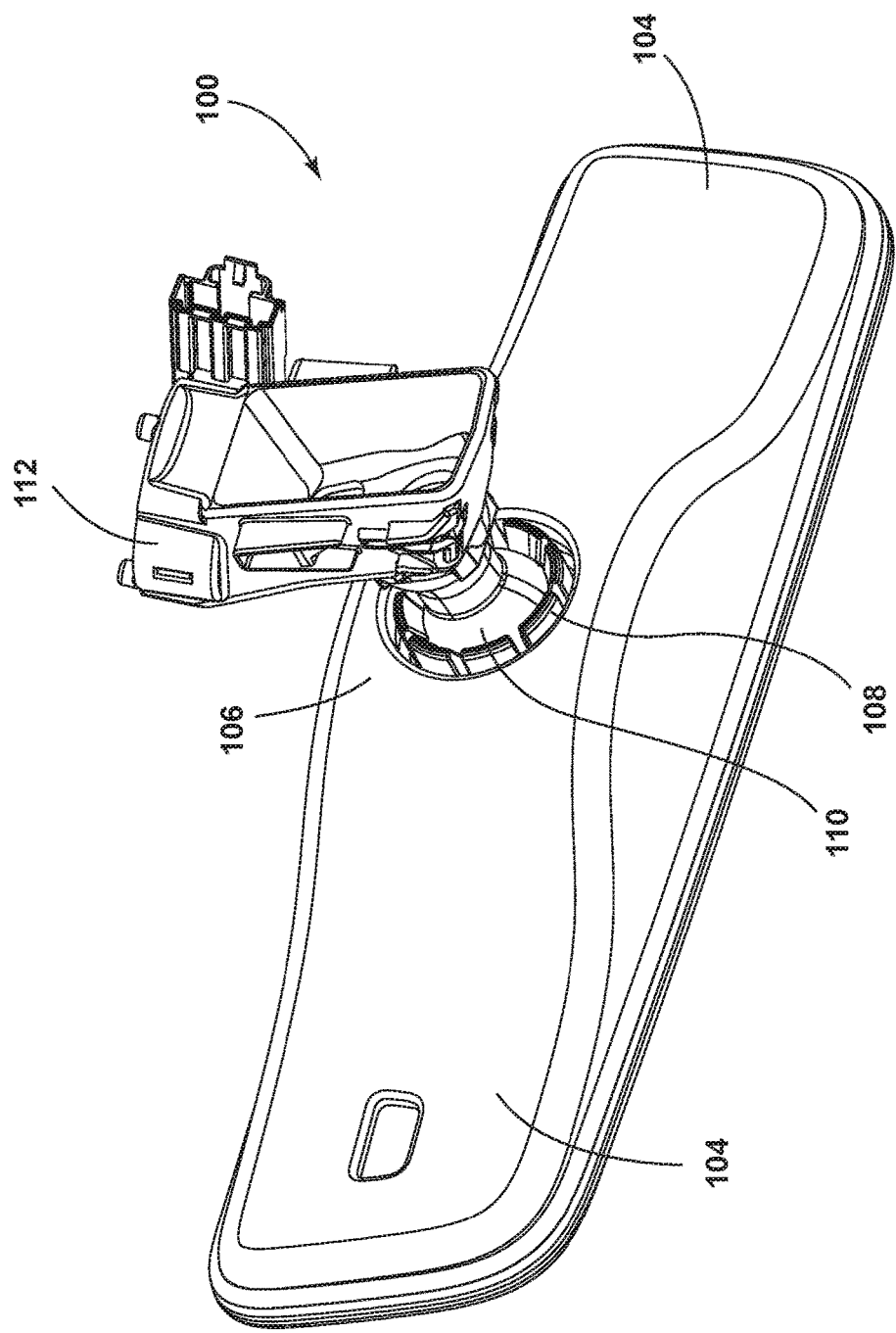
FIG. 10 is a rear bottom perspective view of the rearview assembly of FIG. 9.
Figure 11:
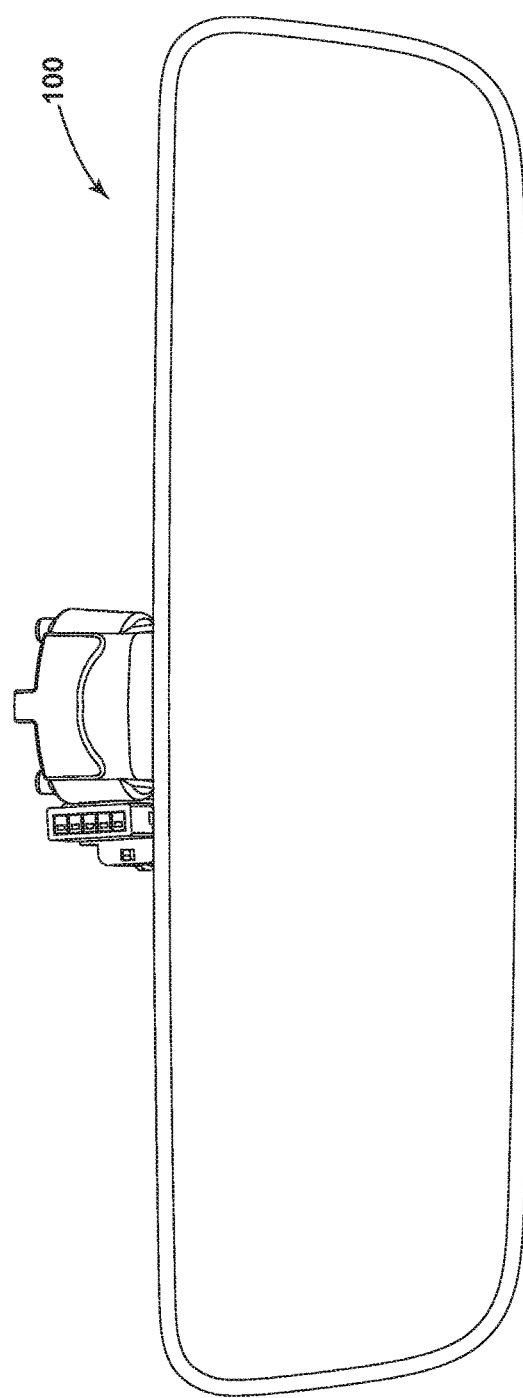
FIG. 11 is a front elevational view of the rearview assembly of FIG. 9.
Figure 12:
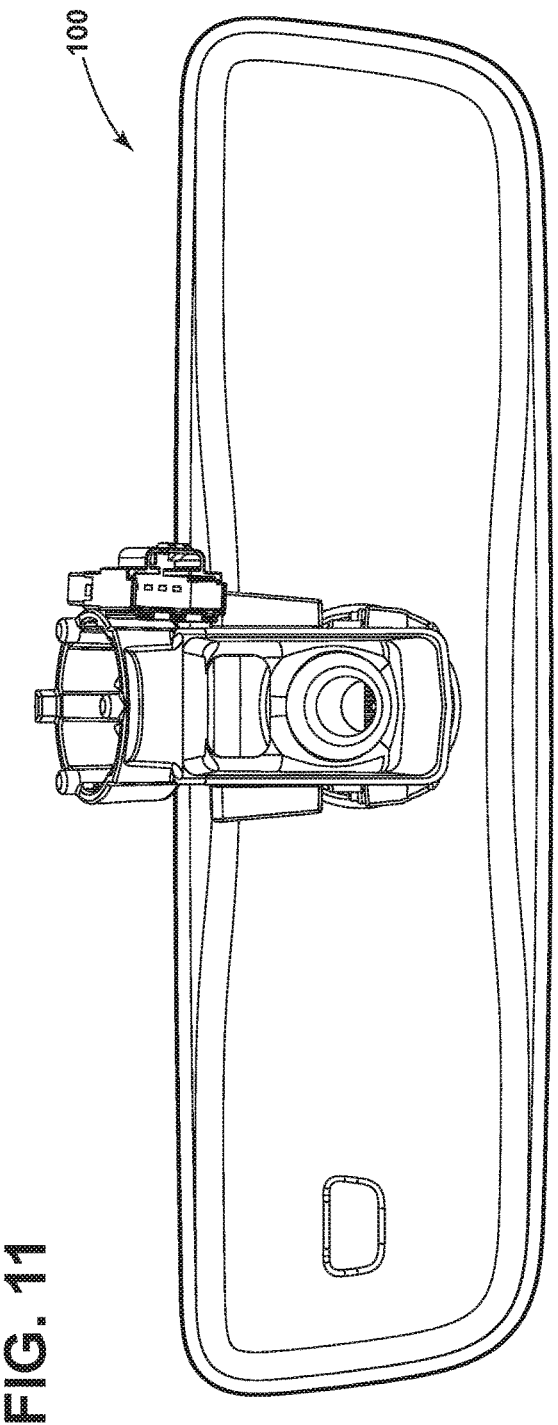
FIG. 12 is a rear elevational view of the rearview assembly of FIG. 9.
Figure 13:
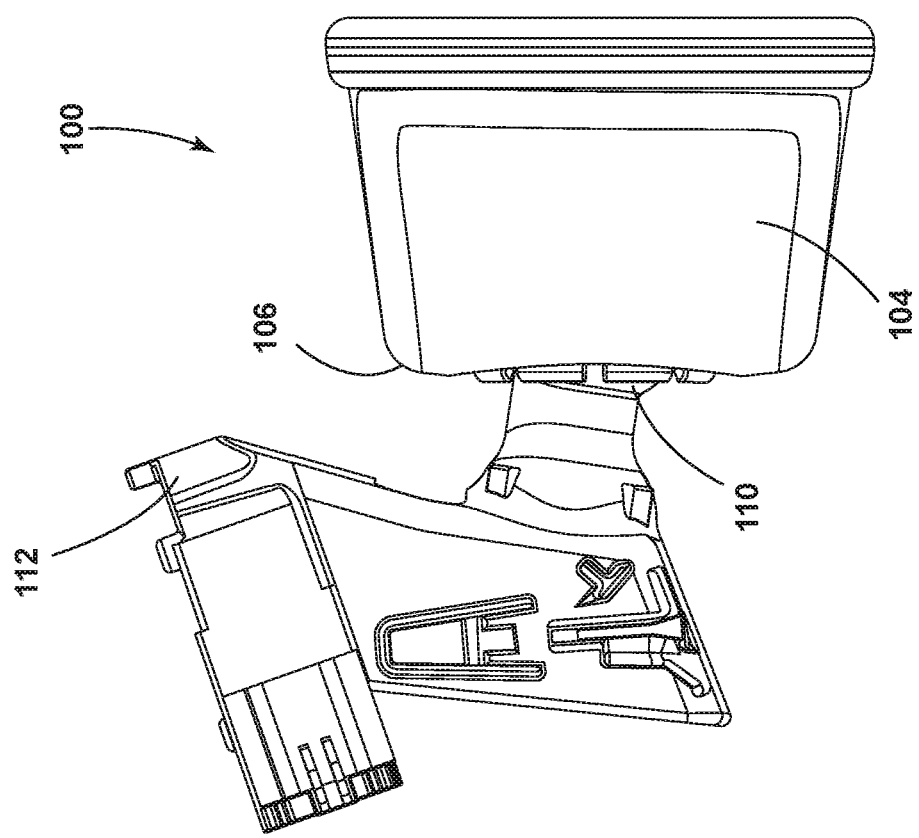
FIG. 13 is a side elevational view of the rearview assembly of FIG. 9.
Figure 14A:
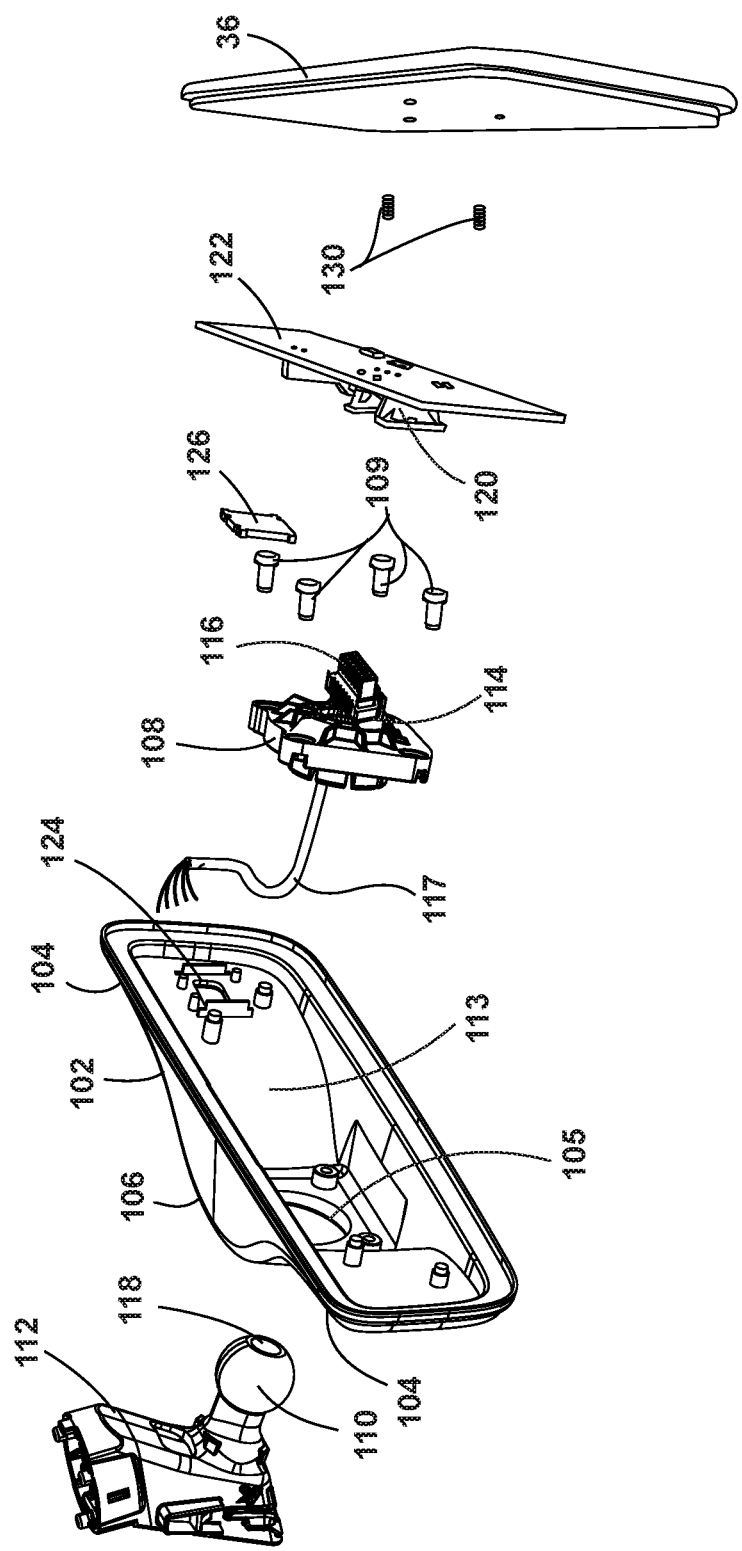
FIG. 14A is an exploded side perspective view of components of a rearview assembly of the present disclosure.
Figure 14B:
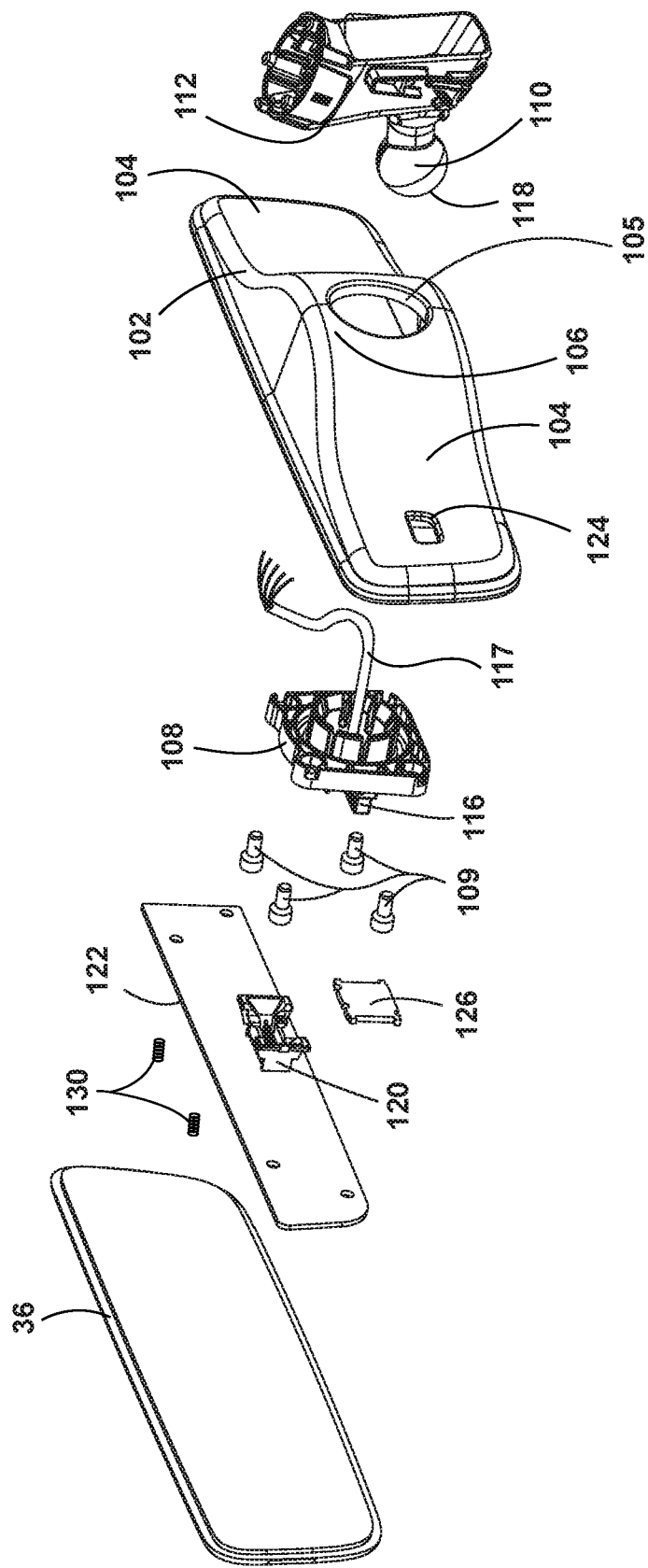
FIG. 14B is an exploded rear perspective view of components of a rearview assembly of the present disclosure.

With reference now to FIGS. 10-12, the rearview assembly 100 includes a housing 102 with side portions 104 that include a generally thin profile. The housing 102 includes an intermediate portion 106 having a thicker profile and which defines an opening 105. The intermediate portion 106 of the housing 102 includes a ball receiver in the form of a socket 108 that is configured to receive a ball 110 of a single ball mount 112. The socket 108 is configured to be secured via fasteners 109 with an inside surface of a rear wall 113 of the housing 102 proximate the opening 105 of the intermediate portion 106. The socket 108 includes a coupler 114 configured to engage an electrical connector 116 coupled with a wiring harness 117 that is routed through a channel 118 of the single ball mount 112. The electrical connector 116 is configured to engage a circuit board connector 120 on a back side of a printed circuit board (PCB) 122, as shown in FIGS. 14A and 14B. Notably, the rear wall 30 of the housing 28 includes an ambient light sensor aperture 124 configured to allow optical communication of an ambient light sensor 126 with an external portion of the housing 102. Accordingly, image data can be obtained by the ambient image sensor 126, which may have an impact on the operability of the rearview assembly generally. The PCB 122 is operably coupled with the electro-optic element 36 via connection springs 130. It will be understood that the assembly, as illustrated in FIGS. 9-15, may vary from the illustrated embodiment. However, it will be understood that the single ball mount construction, and the method in which the single ball mount 112 is coupled to the housing 28 and the electrical/data connection, is made through the single ball mount 112 with the PCB 122 within the housing 28 and will generally be consistent with the figures as shown. During assembly, the single ball mount assembly can be constructed as follows.

Figure 15:
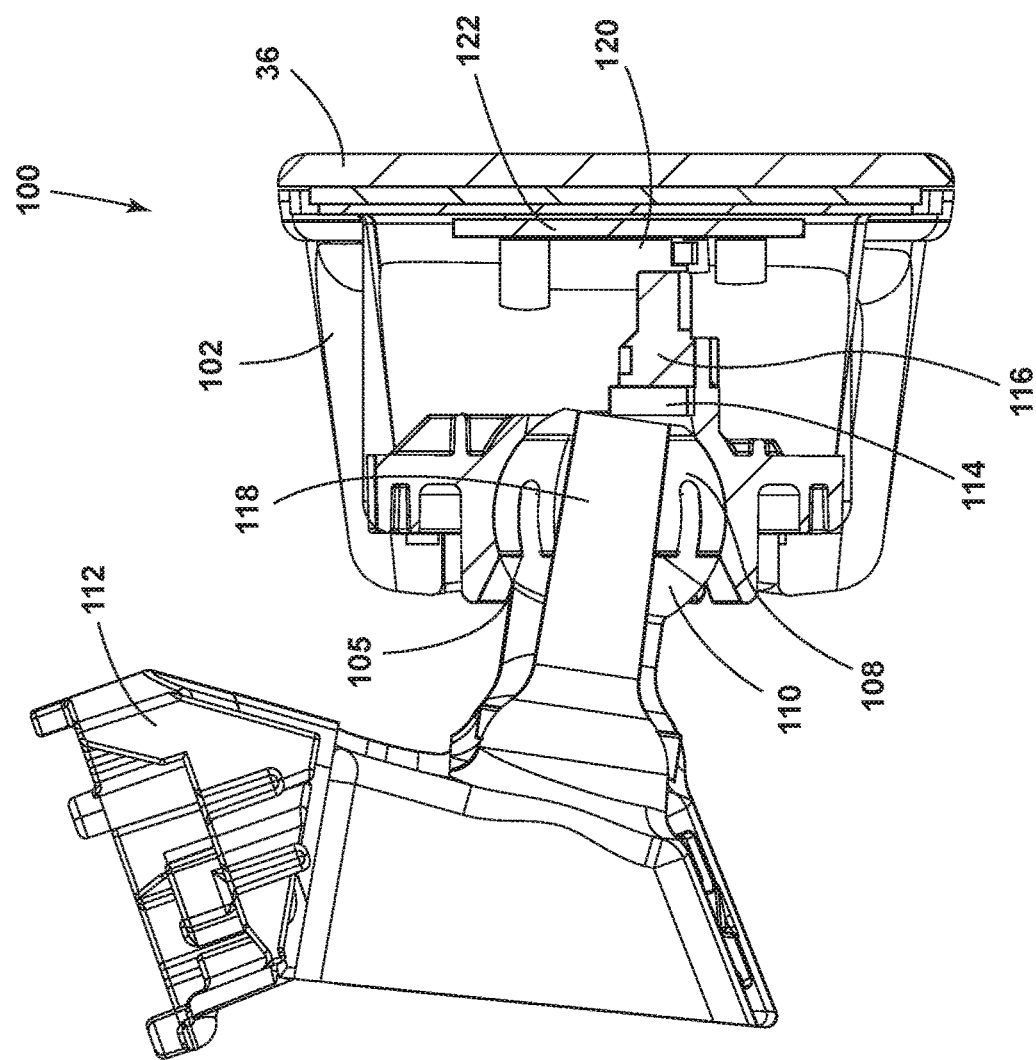
FIG. 15 is a side elevational cross-sectional view of a rearview assembly of the present disclosure.

As illustrated in FIGS. 14 and 15, the single ball mount 112 is positioned in a fixture for an assembly. The housing 102 is then placed over the single ball mount 112 on the fixture. The wiring harness 117 is fed into the single ball mount 112 and the socket 108 is snapped into engagement with the single ball mount 112. The socket 108 is attached to the housing 102 with four mechanical fasteners 109. It will be understood that the number and size of the mechanical fasteners 109 may vary. The electrical connector 116 is then operably coupled with the electrical connector 116 and the ambient light sensor 126 is placed and attached within the housing 102. The PCB 122 and the circuit board connector 120 are operably coupled with the electrical connector 116 on the socket 108. The connection springs 130 are then placed on the PCB 122 and the electro-optic element 36 is positioned against the connection springs 130, making the electro-optic element 36 connection. The electro-optic element 36 is then wet out, and the rearview assembly 100 can be tested. At this point, the construction of the rearview assembly 100 is complete.

The embodiment illustrated in FIGS. 10-15 is an improvement as compared to previous designs because there is no circuitry disposed within the housing 28 of the rearview assembly 100. Specifically, the socket 108 which rests against the inside surface of the rear wall 113 is operably coupled with the electrical connector 116. However, the electrical connector 116 interfaces directly with the circuit board connector 120 to power the PCB 122. During assembly, prior to engagement of the electro-optic element 36 with the housing 102, the socket 108 and the electrical connector 116 are positioned inside the housing, with the wiring harness 117 extending through the opening 105 and into the channel 118 of the ball 110. The wiring harness 117 can then be routed outward through the single ball mount 112. Next, the socket 108 can be securely coupled with the rear wall 113 of the housing 102. After the socket 108 is securely coupled with the inside surface of the rear wall 113 of the housing 102 via mechanical fasteners 109, the ambient image sensor 126, PCB 122, and electro-optic element 36 can be operably coupled with the housing 102. During application of the PCB 122 to the housing 102, the circuit board connector 120 receives the electrical connector 116. As a result, the PCB 122 receives power and the electro-optic element 36, which is coupled to the PCB 122 via the connection springs 130, also has power and can be operated as desired.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly comprising:
   a two ball mount comprising:
      a first end operably coupled with an inside surface of a windscreen;
      a wire harness routed through the two ball mount; and
      a second end having an external mounting plate with an electrical connector disposed thereon;
   a housing operably coupled with the external mounting plate at a rear wall of the housing;
   a circuit board disposed within the housing and including a circuit board connector configured for engagement with the electrical connector at the rear wall of the housing, wherein the housing is free of an internal electrical connector mount bracket and free of wiring that extends through the two ball mount and into the housing; and
   an electro-optic element disposed within the housing and concealing the circuit board.

2. The rearview assembly of claim 1, wherein the external mounting plate includes protrusions configured to engage apertures of the electrical connector.

3. The rearview assembly of claim 1, wherein the electrical connector is configured to engage the circuit board connector at the same time that the external mounting plate engages the housing.

4. The rearview assembly of claim 1, wherein the electrical connector extends into an opening defined in the housing.

5. The rearview assembly of claim 4, wherein the opening includes a periphery that is generally complementary to a perimeter shape of the electrical connector.

6. The rearview assembly of claim 1, wherein the circuit board includes an ambient light sensor in optical communication with an exterior of the housing through an aperture defined in the rear wall of the housing.

7. The rearview assembly of claim 6, wherein the circuit board is in electrical communication with the electro-optic element by way of spring connectors.

8. A rearview assembly comprising:
   a mount comprising:
      a first end operably coupled with an inside surface of a windscreen;
      a wire harness routed through the mount; and
      a second end having an external mounting plate with an electrical connector attached directly thereto;
   a housing operably coupled with the external mounting plate;
   a circuit board disposed within the housing and including a circuit board connector configured for direct engagement with the electrical connector at the external mounting plate; and
   an electro-optic element disposed within the housing and concealing the circuit board.

9. The rearview assembly of claim 8, wherein the electrical connector is configured to engage the circuit board connector at the same time that the external mounting plate engages the housing.

10. The rearview assembly of claim 8, wherein the electrical connector extends into an opening defined in the housing.

11. The rearview assembly of claim 8, wherein the external mounting plate includes a friction fit with the electrical connector.

12. The rearview assembly of claim 10, wherein the opening includes a periphery that is generally complementary to a perimeter shape of the electrical connector.

13. The rearview assembly of claim 8, wherein the circuit board includes an ambient light sensor in optical communication with an exterior of the housing through an aperture defined in the rear wall of the housing.

14. The rearview assembly of claim 13, wherein the circuit board is in electrical communication with the electro-optic element by way of spring connectors.

15. A rearview device for a vehicle comprising:
a mount configured to be operably coupled with a vehicle windshield, the mount including a channel therethrough and an electrical connector;
a wiring harness coupled with the electrical connector and routed through the channel;
a housing having a circuit board, the circuit board including a circuit board connector configured to receive the electrical connector of the wiring harness at a rear opening of the housing as the circuit board is secured to the housing; and
an ambient light sensor optic operably coupled to an interior wall of the housing.

16. The rearview assembly of claim 15, wherein a rear wall of the housing includes a rearwardly extending rim that provides a gripping surface.

17. The rearview assembly of claim 15, wherein the electrical connector extends into an opening defined in the housing.

18. The rearview assembly of claim 15, further comprising:
a mounting plate that includes protrusions configured to engage apertures of the electrical connector.

19. The rearview assembly of claim 17, wherein the opening includes a periphery that is generally complementary to a perimeter shape of the electrical connector.

* * * * *